United States Patent [19]

Takagi

[11] 4,369,988
[45] Jan. 25, 1983

[54] STABILIZER FITTING APPARATUS

[76] Inventor: Tatsuya Takagi, 6-10, Araebisu-machi, Nishinomiya, Hyogo-ken, Japan

[21] Appl. No.: 199,527

[22] Filed: Oct. 22, 1980

[30] Foreign Application Priority Data

Nov. 22, 1979 [JP] Japan .................. 54-150644

[51] Int. Cl.³ ............................................ B60G 19/00
[52] U.S. Cl. ................................... 280/689; 267/67
[58] Field of Search ............... 280/689; 180/73 TT; 188/129; 267/66, 67

[56] References Cited

U.S. PATENT DOCUMENTS

| | | | |
|---|---|---|---|
| 2,615,535 | 10/1952 | Snyder | 188/129 |
| 2,819,063 | 1/1958 | Neidhart | 188/129 |
| 3,315,952 | 4/1967 | Vittone | 280/689 |
| 3,796,288 | 3/1974 | Hollnagel | 188/129 |
| 4,113,278 | 9/1978 | Rissberger | 280/689 |
| 4,168,075 | 9/1979 | Matschinsky | 280/689 |

Primary Examiner—Joseph F. Peters, Jr.
Assistant Examiner—John A. Carroll
Attorney, Agent, or Firm—Birch, Stewart, Kolasch and Birch

[57] ABSTRACT

The reciprocal device is interposed between an end of of a torsion bar and the swing arm of a suspension system for a front wheel of a vehicle so as to reciprocate in both the extensional and intensional directions with the stroke thereof being limited to a length remarkably smaller than the maximum amplitude of the ends of the torsion bar, in response to the movement of the torsion bar. The device has a resisting force that gradually increases while the device is in the advance process from the neutral position to the end of the both strokes but substantially naught when it is in the return process from the end of the stroke to the neutral position.

5 Claims, 7 Drawing Figures

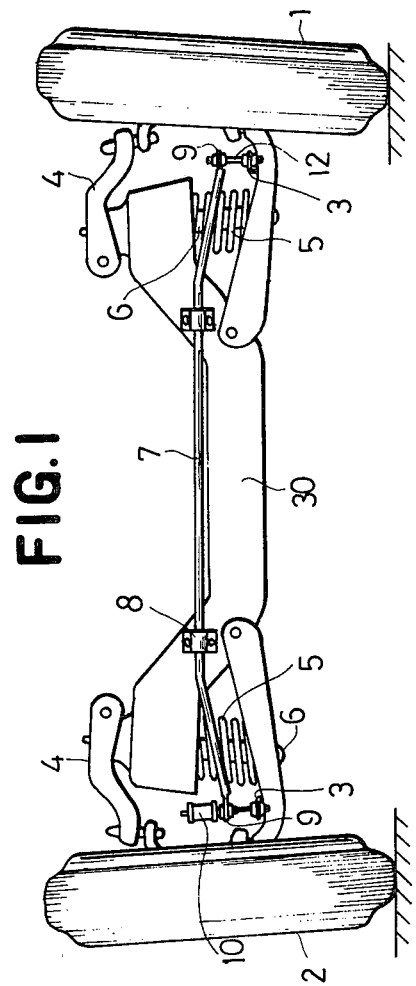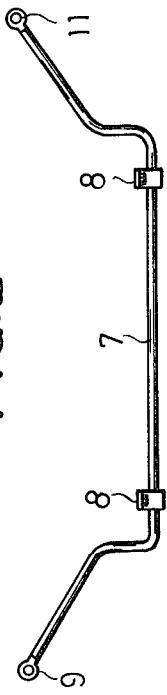

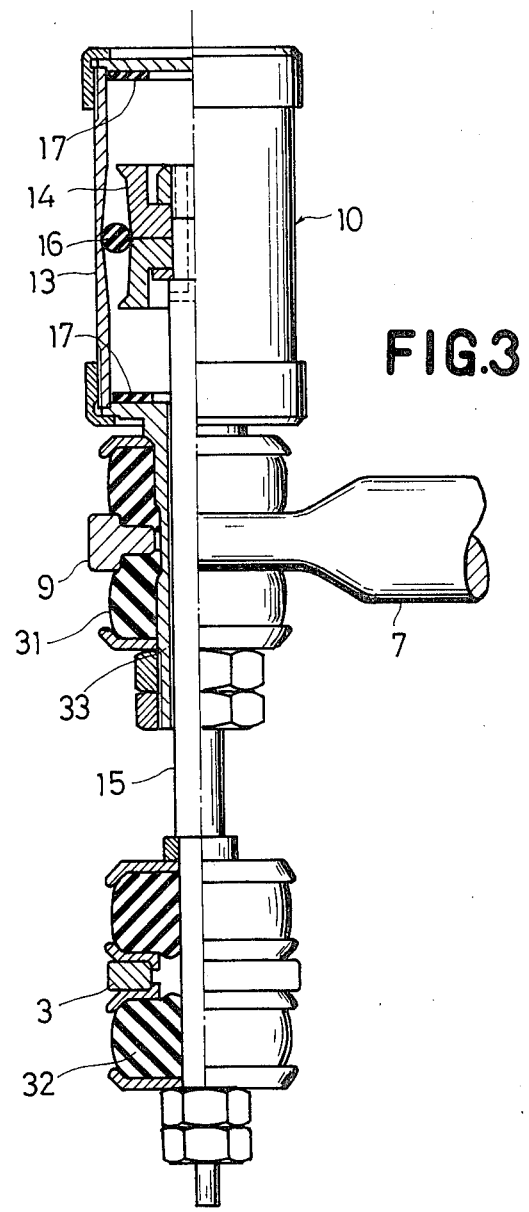

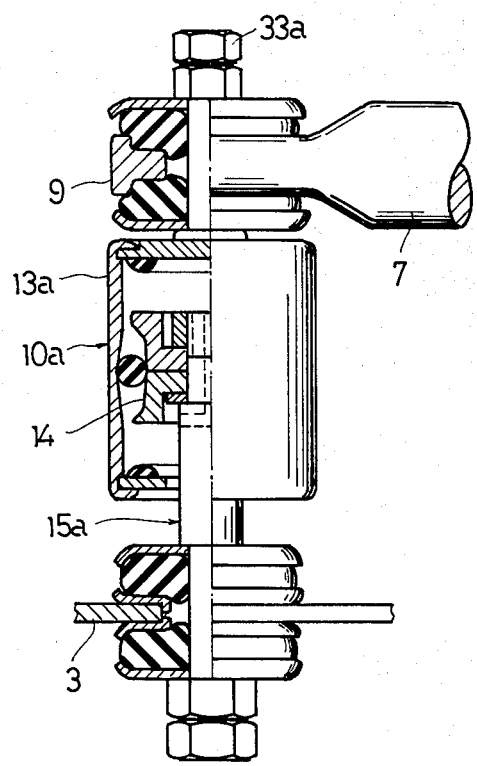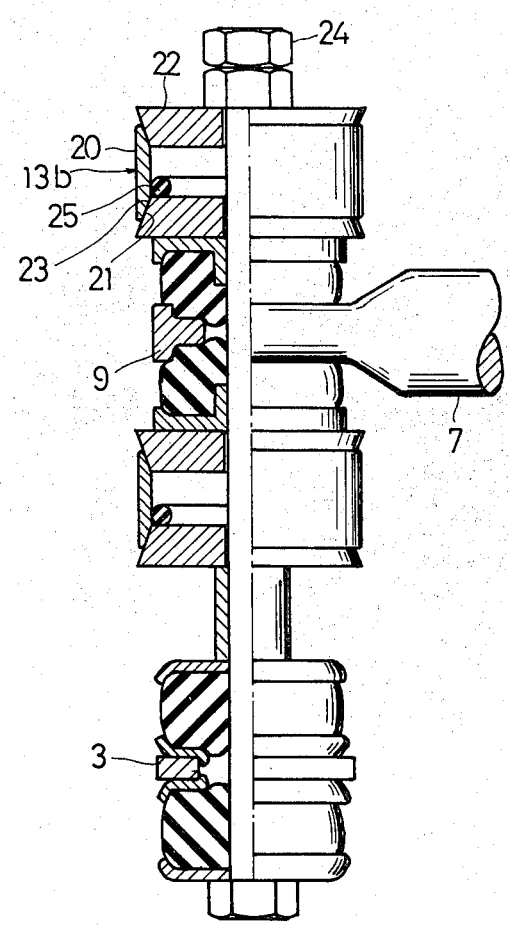

STABILIZER FITTING APPARATUS

BACKGROUND AND SUMMARY OF THE INVENTION

The present invention relates to an apparatus for fitting a stabilizer to a vehicle, particularly to a passenger car.

A passenger car is generally equipped with a stabilizer applied to a pair of front wheels. The stabilizer consists of a U-shaped torsion bar, the opposite ends of which are so connected to the right and left wheels that the torsional resistance of the bar relieves the car from an inclination to one side due to the centrifugal force, while the car turns. Most modern vehicles are designed to be equipped with an independent suspension system for the front wheels, in which each wheel behaves independently from and is unaffected by the other wheel for the purpose of suppressing rolling when traveling straight. High speed operation requires a stabilizer assembly with a stronger torsion bar, but then operation of the supension on one side influences the suspension on the other, leading to considerable disadvantages. One of the disadvantages is that in the case where a wheel passes over a hole in a road when traveling straight, a stronger torsion bar would prevent a wheel from dropping completely into the hole, producing as consequence poor road-holding performance. In this situation, the vehicle would roll more than if a weaker or no torsion bar were fitted. Another disadvantage is that, when the vehicle travels straight, a relatively large bump would induce more roll than were no stabilizer fitted, because the stabilizer and the suspension spring overlap each other to bring an excessively strong action. Furthermore, a shock absorber is required to have a strong braking force sufficient to equal the sum of the spring constants of the respective torsion bar and suspension spring, leading to a further disadvantage that move vibrations under spring are transmitted the frame of the vehicle creating an uncomfortable ride. When one wheel passes over a raised place, the other has the road-holding lowered by the torsional resistance in the stabilizer, resulting in a poor straight-running performance.

The apparatus known by my U.S. Pat. No. 4,066,278 and British Pat. No. 1,514,378 is one that comprises a friction damper assembly of the type having a preselected braking force with a predetermined stroke. The apparatus has been arranged to absorb the initial distorsion of the stabilizer of torsion bar so as to give the vehicle a good straight-running performance and a comfortable ride without diminishing the anti-roll rigidity of the vehicle. That is, without diminishing the resistibility against inclination to one side due to the centrifugal force produced during the turning of the vehicle or the resistibility against side wind. However, the friction damper remains unmoved when a wheel passes over a relatively small bump, because of having the maximum braking force when it commences sliding from the neutral position. Accordingly, the friction damper maintains no better comfort than when the vehicle travels on a good road. The friction damper produces a so-called stick-slip accompanying uncomfortable shock and noise in the starting of movement. The friction damper has a resisting force that is characteristically shown by a flat line without increasing toward the end of stroke and substantially identical in the both advance and return processes. This is the reason why the piston sometimes fails to reach the neutral position and stops at a position slightly before the position in the return process, resulting in the fact that the vehicle is caused to roll when the wheel behaves rapidly.

Stabilizer fitting apparatus, such as the friction damper, must be contained within the recess of a tire together with other parts, such as a brake hose, a brake drum, a lower arm and the like, in order to protect themselves from making a contact with a steering wheel. However, the apparatus as described above is disadvantageously too large to be contained in a restricted space in a small size passenger car.

It is an object of the present invention to provide a stabilizer assembly free from the disadvantages of the prior art.

This and other objects and advantages of the invention may be readily ascertained by referring to the following description and appended drawings.

In accordance with the invention, the stabilizer assembly is capable of nullification of the stabilizer-action while in straight-line traveling and equipped with means for resolving the instability produced by the nullification of the stabilizer-action while turning. The means has a resisting force that gradually increases when it is in the advance process from the neutral position to the end of the stroke and is substantially naught when it is in the return process from the end of the stroke to the neutral position.

BRIEF DESCRIPTION OF THE DRAWINGS

By way of example only, certain specific embodiments of the invention will now be described, reference being made to the drawings, in which:

FIG. 1 is a schematic view of the relevant portion of a vehicle fitted with the apparatus of the invention, the vehicle having a wish-bone type independent suspension system for the front wheel;

FIG. 2 is a plan view of the torsion bar used with the apparatus of FIG. 1;

FIGS. 3 and 4 are elevations, in half-section, of the first embodiment of a piston-and-cylinder type, respectively illustrating the piston in the neutral position and in the end position in the intensional stroke;

FIGS. 6 and 7 are similar views to FIG. 3, of second and third embodiments.

DETAILED DESCRIPTION OF THE EMBODIMENTS

Figure 4:
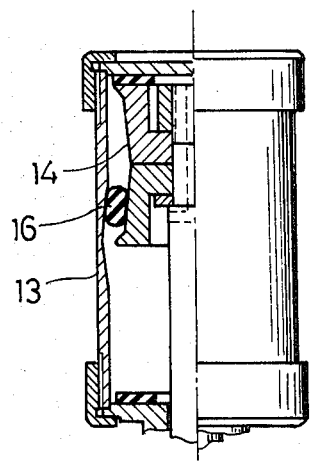

Referring to FIG. 1, the vehicle is equipped with a so-called wish-bone type independent supension system for a pair of front wheels 1, 2 including at each side, upper and lower arms 3, 4 each swingably hinged to a frame 30 of the vehicle. There are a suspension coil spring 5 and a shock absorber 6 interposed between the lower arm 3 and the frame 30. As illustrated in FIGS. 1 and 2, a stabilizer is composed of a U-shaped torsion bar, which has the central portion twistably mounted on frame 30 through the intermediary of a couple of rubber bushings 8. Torsion bar 7 has one end 9 thereof secured to lower arm 3 on one side by a reciprocal device 10 and the other end 11 is fixed to the opposite lower arm 3 by a bolt assembly 12 of such a length as to keep the device in the neutral position when the vehicle is horizontal or level, as seen in FIG. 1. The device 10 is arranged to reciprocate both in the extensional and intensional directions with an identical length of stroke. Device 10 at one end of torsion bar 7 can be replaced by a pair of reciprocal devices as shown in FIG, 6, which are disposed at the both ends of the torsion bar and have a length of stroke equal to the half of that of the device 10.

Referring to FIGS. 3 and 4, reciprocal device 10 includes a cylinder 13 and a piston 14. Cylinder 13 has the inner diameter thereof being maximum at the middle of the length and decreasing toward the opposite ends. The cylinder has a tubular rod 33 connected to the end 9 of torsion bar 7 by a cushion member 31. Piston 14 has the outer diameter thereof being minimum at the middle of length and increasing toward the both ends. The piston is fixed to a piston rod 15, which is guided along the tubular rod 33 and secured to the lower arm 3 by a cushion member 32. Piston 13 is movable in the opposite directions from the middle of cylinder 13 or neutral position with a similar length of stroke, for example 11 mm. An O-ring 16 of thick rubber is disposed between cylinder 13 and piston 14. Top and bottom rubber rings 17 are disposed on the inner top and bottom surfaces of cylinder 13.

The length of stroke is remarkably smaller than the maximum twistable amplitude of the ends of torsion bar 7, in order both supress the increase of roll-angle to the extent of having no uncomfortable effect and to absorb the deformation of the torsion bar when a wheel passes over raised or hollow places on the ordinary road. For example, in the case of a typical 1,300 Kg weight vehicle, an 11 mm stroke corresponds to a 0.7 degree of roll-angle. In view of this, it will be understood that such stroke of piston 14 has no substantial effect upon the stabilizer-action which is needed during turning, because the vehicle has a roll-angle of from 5 degrees to 10 degrees when turning rapidly. The aforementioned stroke is mostly sufficient to relieve the stabilizing force when the vehicle travels on the ordinary road. Even if large raised and hollow places in the road cause the torsion bar to be vertically displaced and twisted, the stroke of the piston will absorb the deformation of the torsion bar and consequently reduce the stabilizing force, resulting in maintaining comfort.

Figure 5:
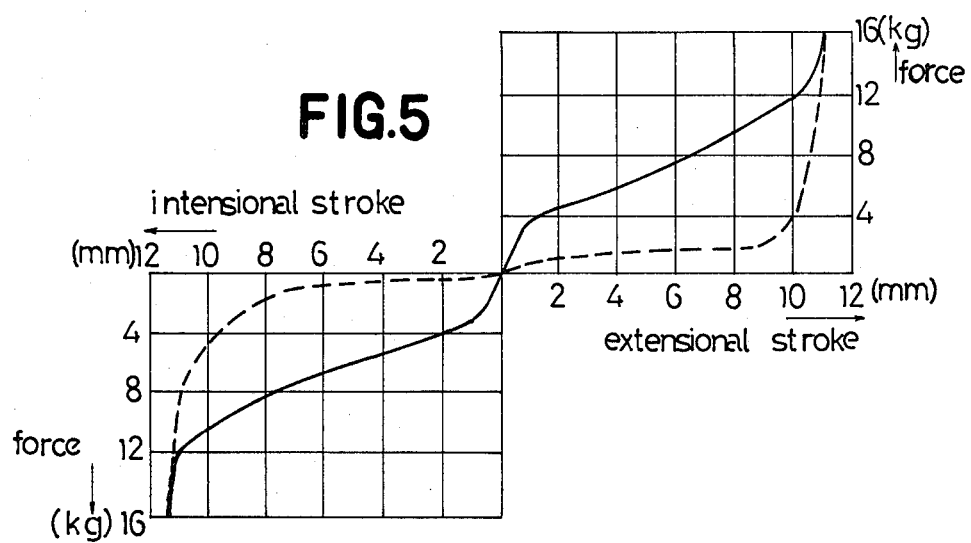
FIG. 5 is a diagram illustrating the characteristics of the embodiment of FIG. 3, the intensional stroke in the right side and the extensional stroke in the left side, and the advance process by the solid line and the return process by the dotted line.

When lower arm 3 is caused to rise by a bump on a road, piston 14 moves upward from the neutral position, as seen in FIG. 4. Meanwhile, O-ring 16 is rolled up and flatly compressed in a void space defined by a cylinder 13 and piston 14. Thus, the resisting force against the movement of piston 14 increases as the piston advances from the neutral position to the top end of cylinder 13. This is shown by the advance process line in the diagram of FIG. 5, in which are shown the characteristics of the reciprocal device for use with a typical 1,3000 Kg weight passenger car. The device has the following particulars; cylinder's taper angle of 4.5 degrees, piston's taper angle of 4.5 degrees, chloroprene O-ring of 32 mm outer diameter, 6 mm cross-sectional diameter, and 70 degrees rubber hardness, with 1 mm initial compression at the neutral position.

After the wheel has passed the bump, piston 14 returns to the neutral position. As shown by the return process line in the diagram of FIG. 5, there is no dynamical stability or resisting force in the return process. One cycle of the advance and return processes defines a closed area in the diagram, which corresponds to an absorption energy being effective to relieve the stabilizing action of the torsion bar and the rolling of the vehicle. When the wheel passes over a hole, the piston moves downward from the neutral position, so that the device performs the same action in the extensional stroke as the intensional stroke.

For the purpose of enlarging the effective absorption energy, the force in the return process should be as small as possible. In preference, the taper angle of cylinder 13 and piston 14 is in a range of from 4 degrees to 5 degrees, because the dynamical stability is naught when the angle is less than 4 degrees and somewhat strong if the angle is larger than 6 degrees. The device requires a small resisting force in the vicinity of the neutral position, otherwise free vibrations occur in the stabilizer to thereby reduce comfort. In view of the rolling rigidity, such a small resisting force is also required. The resisting force is zero when the piston is just in the neutral position but abruptly increases when it is apart even 1 mm from the neutral position, resulting in a smooth starting actuation. The abruptly standing force advantageously enlarges the enclosed area in the diagram, that is, the absorption energy. Therefore, the O-ring is so disposed at the neutral position as to be initially compressed under a certain pressure. The reciprocal device due to the characteristics as described above is capable of going into action by a small amplitude of the torsion bar produced by relatively small bumps and holes in a good road, resulting in a more comfortable ride. As the resisting force gradually increases toward the end of the stroke, the person feels less angular acceleration than the prior art, and the negligible resistance in the return stroke allows the piston to precisely return to the neutral position and decreases the roll or sway of the vehicle as compared to the prior art.

Referring to FIG. 6, in which the second embodiment is shown, the reciprocal device 10a has the same piston 14 as in the first embodiment and a cylinder 13a, the stroke of which is so shortened to be equal to half the stroke of the previous one. Cylinder 13a has a solid rod 33a connected to the end 9 of torsion bar 7. Piston 14 has a piston rod 15a loosely passing through the cylinder 13a and connected to the lower arm 3. Piston rod 15a is angularly, somewhat freely movable in reference to cylinder 13a, so that the device 10a has the property of a free joint. Piston rod 15a needs no rod-guide, so that the second embodiment is so compact as to be suitable for use with a small size car, as compared with the known friction damper.

Referring to FIG. 7, in which the third embodiment is shown, it has a couple of reciprocal ring devices 13b symmetrically disposed on the opposite sides of each end 9 of torsion bar 7 and a bolt assembly 24 having the bottom end connected to the lower arm 3. The bolt assembly 24 axially passes through the ring devices 13b and the end 9 of torsion bar 7 to support the devices 13b from the both outsides. Each ring devices 13b includes a pair of top and bottom inner rings 22, outer ring 20 and a rubber ring 25 disposed on the bottom inner ring 22. The outer ring 20 is a split ring of spring steel and has the top and bottom inner surfaces 21 thereof tapered for sliding engagement with the respective tapered outer surfaces 23 of the top and bottom inner rings 22. The surfaces 21, 23 are preferable to have a common taper angle of 17 degrees. Each device 13b has about 5 mm stroke to give the torsion bar 7 an effect of 10 mm stroke on the both sides from the neutral position. Outer ring 20 has the inner surface lined with tetrafluoro resin having carbon powder as a filler. The inner ring 22, made of aluminum alloy, has the outer surface 23 coated by wear-proof alumina film. The ring device 13b has a great difference in resisting force between the advance and return processes. The characteristics of the third embodiment is graphically similar to that in FIG. 5.

From the foregoing, it will be seen that the apparatus of the invention resolves the disadvantages of the prior art, because it permits the rolling of the vehicle to not stepwise but gradually increase in the transient period without giving uncomfort to persons in the vehicle. The apparatus is more compact in size and simple in construction than the prior art and, therefore, suitable to even small size cars. The apparatus allows a strong stabilizer to be equipped without reducing the merit of the independent suspension system, resulting in many advantages, such as a good road-holding, a good straight-running performance, and a comfortable ride. In addition, the apparatus advantageously interrupts the transmission of vibrations and noises from unsprung parts of the vehicle to the spring parts as an intervention therebetween, otherwise the vibrations and noises rise from the tire to the frame along the stabilizer interconnecting both parts.

What is claimed:

1. A stabilizer assembly comprising:
   (a) a torsion bar having a straight central portion and bent end portions, said central portion being adapted to be twistably mounted on the frame of a vehicle;
   (b) a reciprocal device disposed at least at one end of said torsion bar;
   (c) said reciprocal device comprising first and second members which are movable relative to each other, said first member being secured to the end of said torsion bar and said second member being adapted to be secured to a swing arm of a suspension system of a vehicle; and
   (d) said reciprocal device being normally positioned in a neutral position and movable under a resisting force and a limited stroke, said resisting force gradually increasing according to the displacement from said neutral position but said resisting force being substantially zero as said recirpocal device is returned to said neutral position.

2. A stabilizer assembly according to claim 1, wherein:
   (a) said first member includes a cylinder member having an inner diameter being maximum at a middle portion and gradually decreasing towards opposite ends thereof;
   (b) said second member includes a piston member being positioned within said cylinder member and an outer diameter of said piston member is a minimum diameter at a middle portion and gradually increasing towards opposite ends thereof; and
   (c) an O-ring of rubber material interposed between said cylinder member and said piston member.

3. A stabilizer assembly according to claim 2, wherein said reciprocal device is operatively positioned such that said end of said torsion bar is disposed between said reciprocal device and said swing arm.

4. A stabilizer assembly according to claim 2, wherein said reciprocal device is operatively positioned between said end of said torsion bar and said swing arm; and further including a rod means connecting said piston member to said swing arm, said rod means being slidably and angularly movably positioned within said cylinder means.

5. A stabilizer assembly according to claim 1, wherein:
   (a) said reciprocal device includes first and second ring members;
   (b) each of said ring members including a top and a bottom inner ring and an outer ring interposed therebetween;
   (c) said inner rings having tapered outer peripheral surfaces and said outer ring being a split ring of spring steel having tapered top and bottom surfaces for sliding engagement with said tapered peripheral surfaces of said inner rings;
   (d) each of said ring assemblies being positioned on opposite sides of said end of said torsion bar wherein said first ring assembly is positioned innermost between said torsion bar and said swing bar;
   (e) a bolt assembly slidably passing through said ring members wherein one end of said bolt is secured to said swing arm and the other end of said bolt is secured to the outermost end of said second ring assembly.

* * * * *